No. 633,828. Patented Sept. 26, 1899.
G. N. FRAZIER & C. P. COY.
UMBRELLA SUPPORT.
(Application filed Mar. 30, 1898.)
(No Model.) 2 Sheets—Sheet 2.
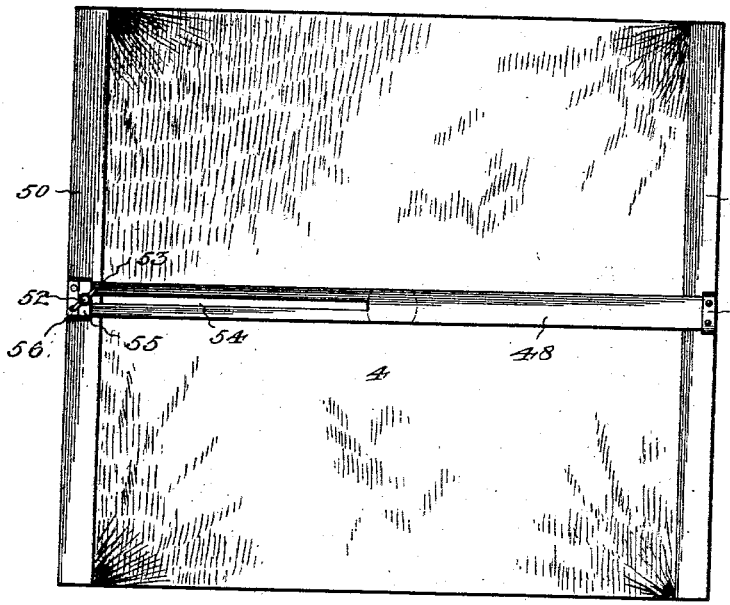
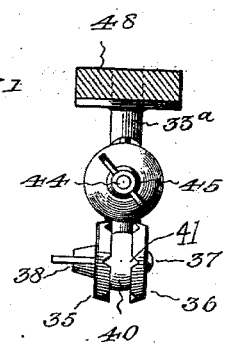
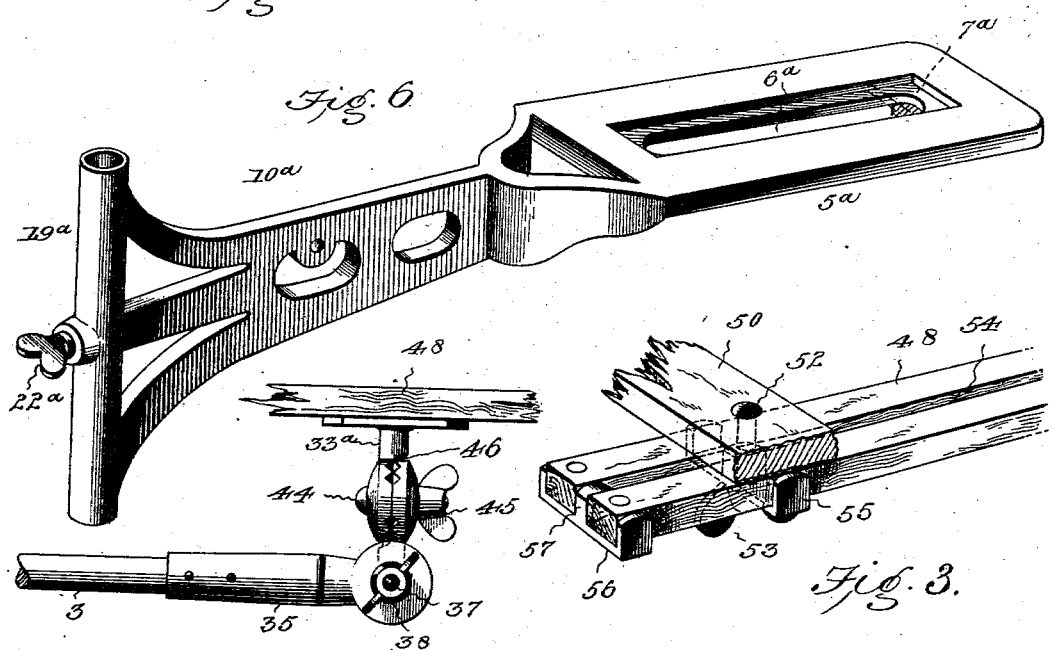
Witnesses
Commodore P. Coy, Inventors
George N. Frazier.
By their Attorneys,

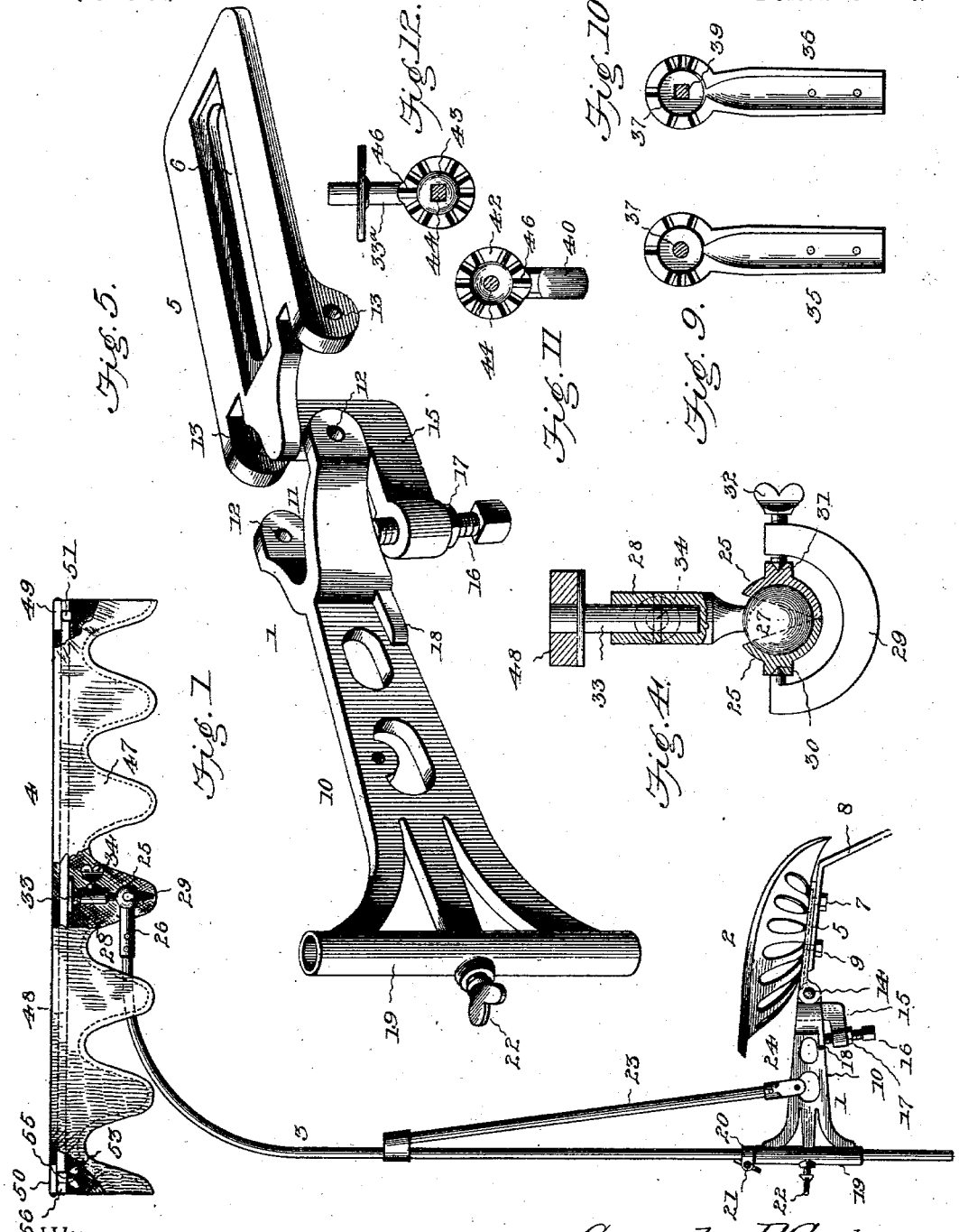

UNITED STATES PATENT OFFICE.

GEORGE N. FRAZIER AND COMMODORE P. COY, OF FORT WAYNE, INDIANA.

UMBRELLA-SUPPORT.

SPECIFICATION forming part of Letters Patent No. 633,828, dated September 26, 1899.

Application filed March 30, 1898. Serial No. 675,764. (No model.)

*To all whom it may concern:*

Be it known that we, GEORGE N. FRAZIER and COMMODORE P. COY, citizens of the United States, residing at Fort Wayne, in the county of Allen and State of Indiana, have invented a new and useful Canopy, of which the following is a specification.

Our invention relates to a canopy for use in connection with the seats of vehicles, agricultural implements, &c., and has for its object to provide in a canopy-support a simple construction and arrangement of parts having means for adjustment whereby the top or cover may be arranged to occupy the desired position to protect the occupant of the seat from rain or the direct rays of the sun.

Further objects and advantages of this invention will appear in the following description and the novel features thereof will be particularly pointed out in the appended claims.

In the drawings, Figure 1 is a side view, partly broken away, of a canopy having a support constructed in accordance with our invention applied in the operative position to a seat of the class ordinarily employed in connection with agricultural implements. Fig. 2 is an inverted plan view of the top or cover of the canopy. Fig. 3 is a detail view in perspective of the joint between the longitudinal and one of the transverse frame-bars of the top or cover. Fig. 4 is a detail view, partly in section, of the connection between the standard and the canopy-top. Fig. 5 is a detail view in perspective of the bracket by which the standard is supported, the members thereof being shown disconnected. Fig. 6 is a similar view of a modified form of bracket, which is of integral construction. Figs. 7 and 8 are respectively side and front views of a modified construction of universal connection between the standard and the canopy-top. Figs. 9, 10, 11, and 12 are detail views of the parts of said connection detached.

Similar numerals of reference indicate corresponding parts in all the figures of the drawings.

The canopy-support embodying our invention consists, essentially, of a bracket 1, which is adapted for attachment to the seat 2 or other suitable fixed part of a vehicle or agricultural implement, a standard 3, supported by said bracket, and a canopy-top 4, which is mounted upon the standard for tilting adjustment in longitudinal and transverse planes to dispose the same in the proper position for the protection of the occupant of the seat. In the construction illustrated in Figs. 1 to 5, inclusive, the bracket is of sectional construction and comprises a seat member 5, having a longitudinal slot 6, through which extends a bolt 7 for engagement with one of the openings in a seat-supporting spring 8 or its equivalent, said bolt having its head fitted in a countersunk portion of the plate 5 with its upper surface flush with that of the plate to adapt the seat 2 to rest squarely upon the plate, and the usual seat-securing bolt 9, which engages the other of the openings in the spring or support 8, is also adapted to pass through the slot 6. Obviously the provision of a slot such as that described in the member 5 adapts the bracket for longitudinal adjustment with relation to the seat, and also provides for the application of the bracket to seats which vary in construction and in the interval between the bolt-openings provided in the spring or seat-standard. The other member 10 of the bracket is bifurcated at its front end, as shown at 11, and the arms of the bifurcation terminate in bolt-eyes 12 for registration with corresponding bolt-eyes 13 on the rear end of the member 5 for the reception of a transverse pivot-bolt 14. The stationary member 5, upon which the movable rear member 10 is thus pivotally mounted for swinging movement in a vertical plane, is provided with a rearwardly-extending tongue 15, in the extremity of which is mounted an adjusting-screw 16, having a jam-nut 17 and bearing terminally against a lateral enlargement 18 in said swinging member 10, whereby the latter may be held in the desired position with relation to the stationary plate, and thus adapt the bracket for use in connection with seats arranged at different inclinations without affecting the positions of the other parts of the canopy.

The rear end of the movable member 10 of the bracket is constructed to form a tubular standard-socket 19, in which is fitted the standard 3, preferably of tubular construction, said standard being provided with an adjustable collar 20, which is of split-ring construction, with its terminal ears connected by a thumb-screw 21. This collar rests upon the upper end of the socket 19 to prevent vertical displacement of the canopy-standard when a locking-screw 22, with which the socket is provided, is loosened to allow the revoluble adjustment of the standard. Also in order to strengthen the canopy-standard against forward and rearward vibration we preferably extend an inclined brace 23 from a point on the bracket in advance of the standard to a sleeve 24, through which an intermediate portion of the standard passes, the standard obviously being adjustable through this sleeve when the elevation of the canopy-top is varied.

The modified construction of bracket illustrated in Fig. 6 embodies a single-piece casting, wherein the front or plate portion 5ª, the longitudinal slot 6ª, the securing-bolt 7ª, the rear or standard-supporting portion 10ª, the socket 19ª, and the locking-screw 22ª are of substantially the construction hereinbefore described and shown in connection with the figures illustrating the preferred form of our invention. In this form, however, the seat and standard portions or members of the bracket are integrally constructed, whereby a simplification, desirable under certain circumstances, is attained.

The canopy-top 4 is mounted upon the upper forwardly bowed or extended extremity of the canopy-standard 3 for universal swinging movement to adapt it to be tilted in either a longitudinal or a transverse plane to dispose said top in the proper position to protect the occupant of the seat, and in the construction illustrated in Figs. 1 to 5 this connection consists of a universal or ball-and-socket joint comprising a socket member including registering oppositely-located cups 25, having grooved stems 26, which are secured by bolts or rivets to opposite sides of the upper extremity of the stem, a ball member 27, fitted between said cups of the socket member and having a stem 28, and a clamp 29, consisting of a yoke, which bears terminally against the exterior surfaces of the cups and is provided with center points 30 and 31, fitted in center sockets in the cups. The center point 31 is preferably adjustable and is carried by the thumb-screw 32, threaded in one arm of the yoke, and it is obvious that by tightening this thumb-screw the cups may be pressed toward each other to firmly grip and secure the ball member of the joint at the desired adjustment, whereas by loosening the thumb-screw the ball may be released to provide for adjustment of the canopy-top either laterally or forwardly and rearwardly to secure the desired inclination and position thereof. The stem 28 is preferably of tubular construction to form a socket, in which is fitted a pin 33, depending from the frame of the canopy-top, and carried by this socket is a thumb-screw 34 for impinging terminally against the stem to lock the canopy-top in place upon the standard. Obviously the canopy may be removed by loosening this thumb-screw 34, and also angular adjustment of the canopy-top may be accomplished by means of this pin, which is preferably of cross-sectionally round construction to correspond with that of the socket in which it is fitted. Any necessary angular adjustment of the canopy-top, however, may be accomplished by means of the ball member of the joint, which obviously is capable of revoluble movement on the socket member when the securing device by which the cups of the socket member are held in operative relation is loosened.

In the construction illustrated in Figs. 7 to 12, inclusive, the universal connection between the standard and the canopy-top consists of opposite registering clutch members 35 and 36, having serrated inner faces and central registering bolt-openings for engagement by a clamping-bolt 37, which is fitted with a thumb-nut 38, said bolt having a squared portion 39 to fit in the correspondingly-squared opening in the member 36, a clutch-ring 40, mounted upon the bolt 37 and interposed between the serrated faces of the clutch members 35 and 36, said ring having detents or webs 41 to engage the serrations of the clutch members, and a clutch connection between the clutch-ring 40 and the pin 33ª, which depends from the frame of the canopy-top. The clutch members 35 and 36 are provided with shanks or stems, which are secured to rivets, bolts, or analogous fastening devices to opposite sides of the contiguous portion of the standard, and as the clutch members are disposed in vertical longitudinal planes it is obvious that the clutch-ring is adapted to turn to allow swinging movement of the pin 33ª in a longitudinal plane. In order to provide for swinging movement in a transverse plane, however, we employ a clutch connection between the pin 33 and the clutch-ring 40, the same consisting of clutch members 42 and 43, carried, respectively, by said clutch-ring 40 and stem 33ª and provided with registering openings, through which passes the bolt 44 of a clamping device, said bolt being fitted with a thumb-nut 45. The faces of the clutch members 42 and 43 are serrated and are provided, respectively, with detents 46 to insure a firm interlocking connection between the members.

The canopy-top which we prefer to employ in connection with the construction above described consists of a frame provided with a suitable cover of cloth, ducking, rubber, oilcloth, leather, or other suitable material, and when desired having a valance 47, the frame which is illustrated in the drawings including a longitudinal bar 48, which may be of metal, wood, or any suitable material, and front and rear cross-bars 49 and 50, one or both of which may be mounted upon the longitudinal bar for adjustment parallel therewith. In the construction illustrated the front cross-bar is permanently secured in position to the longitudinal bar by means of rivets or the equivalents thereof, a suitable clip 51 or a plurality thereof being employed to strengthen the connection, while the rear cross-bar is mounted upon the longitudinal bar for adjustment and is provided with a clamping device, including a bolt 52 and a thumb-nut 53, of which the former extends through a longitudinal slot 54 in the bar 48. A clip 55 is also employed at this point to receive the pressure of the thumb-nut. As the cover is flexible, it is obvious that the adjustment of the movable cross-bar not only enables the operator to maintain the cover in a taut condition, but provides for the folding of the top into compact form when not in use. Also a spacing-clip 56 is preferably secured to the longitudinal bar at the extremity of its slotted arm and is provided with a spacing-tongue 57, fitting in a slot 54, to maintain the walls of the latter at the proper interval to facilitate the adjustment of the cross-bar with relation thereto.

From the above description it will be seen that the canopy embodying our invention is adapted for application to the seats of vehicles and agricultural machines without modification in the construction of the seat, and the sectional or jointed form of bracket is adapted to provide for the adjustment of the canopy-standard to occupy the desired position irrespective of the inclination of the vehicle or machine seat. Furthermore, it will be seen that the top is capable of universal movement and is provided with clamping devices whereby it may be secured at the desired adjustment, and thus it may be tilted in either longitudinal or transverse planes to afford the desired protection to the occupant of the seat, the standard also being vertically adjustable with relation to the bracket to vary the elevation of the top.

The revoluble adjustment of the depending pin 33 in the socket 28 not only allows for angular adjustment of the canopy-top independently of the socket, as after the ball member 27 has been clamped in place, but adapts said canopy-top to be arranged with its sides parallel with the direction of movement of the carriage or vehicle when the standard 3 has been turned in its socket 19 to arrange the approximately-horizontal upper portion of said standard obliquely with relation to the direction of movement to throw the canopy more over one side of the seat than the other. Furthermore, the described means of securing the pin 33 in the socket 28 adapts the canopy-top to be removed without displacing or disarranging the other members of the device. Furthermore, the described means for adjusting the spring-actuated or yielding cup members 25 to bring them into frictional contact with the ball member 27, said means consisting of the yoke 29 and adjustable center point 31, provides for arranging said clamping means to suit the position of the socket member 28 with relation to the standard. For instance, if the canopy-top is tilted forward the yoke 29 may be swung to the rear. Furthermore, said described clamping means provides for applying the pressure to the cup members upon a diametrical line, and hence avoids thickening or complicating the construction of the socket member or the standard member, as when one of the cup members is adjustable by means operating thereon at a point remote from the ball member.

Various changes in the form, proportion, and the minor details of construction may be resorted to without departing from the spirit or sacrificing any of the advantages of this invention.

Having described our invention, what we claim is—

1. The combination with a vehicle-seat and standard, the former being removably bolted to the latter, of a sectional bracket having a longitudinally-slotted seat member interposed between the seat and standard and engaged by the seat-securing bolts, and a standard member pivotally mounted upon the seat member, means for securing the standard member at the desired angular adjustment with respect to the seat, and a canopy-standard carried by said standard member, substantially as specified.

2. The combination with a vehicle-seat and standard, the former being removably bolted to the latter, of a sectional bracket having a longitudinally-slotted seat member interposed between the seat and standard and engaged by the seat-securing bolts, and a standard member 10 pivotally mounted for swinging movement upon the seat member and provided with a standard-socket and standard-locking means, a rearwardly-extending tongue 15 carried by the seat member, to project under the standard member, and having a terminally-threaded socket, and an adjusting-screw fitted in said socket and terminally arranged in the path of downward-swinging movement of the standard member, to hold the latter at the desired angular adjustment with relation to the seat member, substantially as specified.

3. The combination with a canopy-standard, and a canopy-top having a depending pin, of a socket for the reception of said pin, and a pivotal connection between said socket and the standard, said connection having one member consisting of spaced cup-shaped elements carried by the standard, and an interposed spherical element carried by said socket, the elements carried by the standard being yieldingly held separated, and adjusting devices for moving the standard-supported elements toward each other to clamp the interposed socket-carried element at the desired adjustment, said means consisting of a yoke 29 having terminal center points fitted in center sockets in the said yielding elements, one of the center points being axially adjustable, substantially as specified.

4. In a canopy-support, the combination with a canopy-standard, of a bracket provided with means for attachment to a vehicle or other seat and having a socket for the reception of the canopy-standard, a locking-screw for securing said standard at the desired adjustment, a collar adjustably mounted upon the canopy-standard to bear upon the upper end of the socket, and a brace secured at its lower end to the bracket and provided at its upper end with a sleeve through which the canopy-standard extends for vertical sliding movement, substantially as specified.

In testimony that we claim the foregoing as our own we have hereto affixed our signatures in the presence of two witnesses.

GEORGE N. FRAZIER.
COMMODORE P. COY.

Witnesses:
  DANIEL MCFAULL,
  JNO. A. COY.